Patented Mar. 25, 1952

2,590,646

UNITED STATES PATENT OFFICE 2,590,646

COCOA PROCESSING AND PRODUCTS

Elmer K. Pettibone, San Francisco, Calif.

No Drawing. Application November 25, 1949,
Serial No. 129,502

12 Claims. (Cl. 99—23)

(Granted under the act of March 3, 1883, as
amended April 30, 1928; 370 O. G. 757)

The invention described herein, if patented, may be manufactured and used by or for the Government for governmental purposes without the payment to me of any royalty thereon.

This invention relates to improved cacao materials or products and method of manufacture. More particularly, the improvement resides in mellowing and intensifying or enriching and accentuating cocoa and chocolate flavor by processing cacao beans or nibs and the like with hydrolyzed vegetable protein and the products obtained thereby.

The adding of a hydrolyzed vegetable protein to foodstuffs broadly, as a nutritive addition, and the sweetening of cocoa and chocolate with sweetening agents and the like or other and supplementary materials, as lecithin (a nonhydrolyzed extract from soybeans, eggs, and other materials) and the like, in the production of food products has long been known in the trade. However, modification of the cacao itself, somewhat in the nature of the heretofore known alkali processing, by hydrolysates of vegetable protein, whereby reduction of cocoa and chocolate quantities are possible by reason of enrichment, retention and enlargement of cacao quality and improving of cacao flavor with loss of the characteristic flavor of the hydrolyzed vegetable protein has heretofore not been known.

Accordingly, it is an object of this invention to provide improved cacao products.

Another object of this invention is to provide an improvement in accentuating and enriching cocoa and chocolate flavor permitting substantial reduction in cocoa and chocolate quantities.

Another object is to provide a cocoa and chocolate material modified by hydrolysates of vegetable protein.

A further object is to provide a method or process for enriching, mellowing and accentuating cocoa and chocolate flavors.

Other objects, advantages, adaptations, modifications and alterations will be apparent from the following illustrations and specific examples.

A preferred process, for accomplishing the purposes of the herein described improvement in cocoa values is to add solutions of vegetable protein hydrolysates obtained from commercial processing of wheat, corn, soybeans, or sugar beets and the like, containing all the derived hydrolysate constituents, to cleaned and preferably roasted or otherwise commercially treated cacao nibs or the like. Thereafter, the nibs and hydrolysate solution are mixed by suitable agitation and the mixture is then ground or milled to fine granular or powder form by conventional equipment. While the solution concentration may be of any desired fluidity, for example, having 50 per cent moisture content or less, it is preferred to add from 8 per cent to 18 per cent hydrolysate solids based on total weight of combined solids. In any event, excessive moisture in the milled mixture, if present after grinding, may be removed by vacuum dehydration or other suitable dehydration processes, as in conventional usage before or after expressing cacao fat in a conventional manner, if desired.

The commercial solutions of vegetable protein hydrolysates, herein described, are obtained by conventional commercial processes, including acid hydrolysis, alkali hydrolysis or enzymatic hydrolysis of protein vegetables in the nature of wheat, corn, soybeans, sugar beet by-product, or any combination of these, and other like vegetable sources.

The preferred solution is one which retains substantially all of the amino acids obtained by hydrolyzing proteins of the character indicated. These amino acids may vary in number and in percentage of each dependent upon the basic raw material or materials used and the method of processing and hydrolyzing. However, as an illustrative example, a commercial solution of vegetable protein hydrolysates, used in the manner as described herein, contains most or all of the following named amino acids:

| | |
|---|---|
| Alanine | Lysine |
| Arginine | Methionine |
| Aspartic acid | Phenylalanine |
| Cystine | Proline |
| Glutamic acid | Serine |
| Glycine | Tyrosine |
| Histidine | Threonine |
| Hydroxyproline | Thyroxine |
| Isoleucine | Valine |
| Leucine | |

Some commercial solutions of vegetable protein hydrolysates may contain amino acids not specifically mentioned, as for example, in some instances the amino acid tryptophane may be added or otherwise, the solution may lack one or more of the amino acids for some specific purposes. Further, some amino acids may be present in such small quantities as to constitute what are commonly known as trace materials. While some variations are permissible, due to the vegetable source or otherwise as heretofore indicated, it is preferred for most purposes, as herein indicated, that the glutamic acid constitute at least approximately 30 per cent by weight of the protein solids content of the solution.

Illustratively, for example, an average composition, suitable for average taste characteristics may be prepared by mixing 90 lbs. of roasted cacao nibs with 20 pounds hydrolysates containing 9 pounds solids. After mixing the nibs are ground, by conventional apparatus, to eventual powder form with or without vacuum dehydration, and expression of cacao fat, to provide a chocolate material which may be packaged in conventional manner and kept indefinitely. Without expression of cacao fat, the chocolate is known as "bitter" which taste characteristic is somewhat reduced by the method of treating cacao beans, in the manner as herein described. Otherwise the hydrolysate addition may be compounded, with cacao, before or after a conventional expression of a portion of the cacao fat, as desirable.

Further, a composition may be formed by adding, for example, to cacao liquor or bitter chocolate a solution or fluid concentrate of vegetable protein hydrolysates in the approximate proportionate parts of 100 pounds cacao liquor constituting 33 per cent moisture and 67 per cent solids, 6 pounds hydrolysates solids in a 50 per cent solution or more or less, as desired. The liquor mix is milled or agitated as required, and run-off into molds or solidified by suitable conventional means.

In general, solutions containing hydrolyzed vegetable protein of ordinary commercial fluidity containing 50 per cent moisture more or less, can be mixed with the cacao nibs, after cleaning and roasting, and ground to powder form, or mixed with "wet" cocoa, or sprayed onto dried and ground cocoa. The percentage of moisture introduced may provide a syrup or may be removed by vacuum drying or other suitable method with care being taken to avoid loss of cocoa modification and nutritive values.

Another process for obtaining a modified cocoa powder is to prepare a concentrated solution of hydrolyzed vegetable protein as a warm plastic mass, by a vacuum process, having a solids value of from substantially 80 per cent to 96 per cent and preferably with retention of not less than substantially 30 per cent of the protein content as monosodium glutamate or glutamic acid and all the hydrolyzed products of a vegetable protein hydrolyzation process. This concentrate in a warm state is stirred or mechanically mixed by conventional means with dry cacao powder, or cocoa and chocolate producing material in the nature of cleaned, hulled and sized cacao beans or nibs, with or without previous processing of the cacao material, as expressing cacao fat therefrom or formation of a cacao liquor. Specifically the components are added in the proportion of approximately 35 pounds hydrolysate fluids by weight to 100 pounds nibs, for example, or otherwise the hydrolysate solids in solution may vary from substantially 4.5 per cent to 18 per cent or more by weight to the total combined weight of the mixture. From experimental results it appears that for average taste characteristics, that from 12-14 per cent hydrolysate solids to total combined weight of solids is most acceptable, although for some general purposes other percentages may be used.

When the cacao or cocoa forming material is in granular form and the plastic hydrolysates of vegetable protein are substantially uniformly mixed therewith, the mass is ground or milled to reduce particle size and then stone roller milled or disc milled in a conventional manner to pulverize the granules.

The grinding and milling operation creates heat which keeps the mass in liquid form and produces modified chocolate when solidified after final milling. In the event that excessive moisture is present in the compound and the powder form modified cacao is desired, vacuum dehydration or drying by conventional apparatus, which does not destroy the modification provided or the nutritive value of the compounded powder, may be used. The dried or undried compounded cacao product may be packaged by conventional means for subsequent use at later periods as its preservative powers are greatly improved. Further, conventional removal of cacao fat before or after compounding with the hydrolyzed vegetable proteins, of the character herein described, will not affect the modification reaction.

A further method, although somewhat less satisfactory, for enrichment and accentuation of cocoa flavor is to spray a cocoa powder with an aqueous solution of vegetable protein hydrolysates, having a solids weight of from 50 to 65 percent, preferably in the approximate proportion of from 8 to 18 per cent, based on solids weight, and containing substantially 30 parts by weight glutamic acid per 100 parts of protein solids with suitable mechanical mixing for incorporating the hydrolysates therein. Surprisingly, the cocoa powder retains its fluffy form and does not appear to be wet or lumpy with hydrolysate additions on the order of 8 to 18 per cent based on solids weight, and using a hydrolysate solution containing 50 per cent moisture. The resulting modified cocoa powder may be packaged and sold in wet form, for example, as a chocolate syrup, or as a semi-solid product by the addition of a moistening agent and packaging or solidifying and packaging in a conventional manner. Otherwise, the modified powder may be packaged in a conventional manner for conventional use as a dry cocoa. Cocoa in its final powder form is the cacao liquor having a portion of its cacao fat removed by pressure or conventional processing. If desired, dependent upon the final product and taste requirements suitable flavorings and/or sweetening agents as sugar or the like, certain minerals, vitamins, and other health improving chemicals may be added to the modified chocolate in the approximate proportion of from 1 per cent to 20 per cent or more prior to packaging.

When the modified cacao product is in either the dry or syrup form it is in condition for use in reduced quantities to provide upon the addition of water, milk or other solvent, emulsifying or solubilizing agent, as desired, either in a cold condition, heated condition, or with the application of heat during mixing, an enriched foodstuff with improved flavor intensification.

It may be stated that a less preferred method and one which is found unsuitable for producing an entirely satisfactory all-purpose product is that of simple mixing and agitation of dried vegetable protein hydrolysates with chocolate or cocoa material in the proportions of from 10 to 25 per cent hydrolysates by weight. In this aspect, it is to be understood that monosodium glutamate alone is not effective in producing the results of the protein hydrolysates, as herein described, and that the so-called "end liquor," that is, a hydrolyzed vegetable protein solution from which the glutamic acid is substantially absent, is not preferred for cocoa modification in accordance with my invention though it may produce sufficient satisfactory results for some purposes.

By treating or compounding chocolate and cocoa with hydrolyzed vegetable protein in solution, it has been discovered that the cocoa flavor, by aging, chemical reaction, or otherwise, is mellowed, enriched, and intensified or accentuated to the extent that from one-third to three-fourths less cocoa or chocolate is required in mixtures or compositions wherein cocoa or chocolate has heretofore been utilized, with the balance of the ingredients, including sweetening agents as sugar or the like in the same proportionate parts or modified and substituted as conventional in the culinary arts. Further, the hydrolyzed vegetable protein material appears to lose its characteristic flavor in augmenting and mellowing the cocoa flavor.

Thus, the amount of chocolate or cocoa required in any particular instance is materially and substantially reduced as well as its cost of manufacture. Particularly is the production cost reduced when dried cacao beans or nibs and the like are compounded with vegetable protein hydrolysates, in comparison with cocoa improved by the "Dutch Process" or alkali treatment.

The term "cocoa flavor," wherever used in the specification or claims, also encompasses chocolate flavor in solid or liquid chocolate products.

Having thus described my invention of improving cacao material and providing improved cocoa and chocolate products which considerably decrease the cocoa and chocolate content required in foodstuffs, yet retain, mellow, and improve the cocoa and chocolate flavor, I wish it to be understood that many and varied usages may be made thereof with additions, changes, or modifications which fall within the scope of the following claims.

I claim:

1. The method of improving a cacao product by mellowing, accentuation and enrichment of cacao flavor comprising mixing with cacao bean material a plastic mass of vegetable protein hydrolysates concentrated to a solids content of from substantially 80 per cent to 94 per cent, milling the mixture to reduce the beans to granular size, powdering the granular mix, expressing cacao fat therefrom and drying the compounded powder.

2. The method of providing an improvement in cocoa by mellowing, accentuation and enrichment of cocoa flavor comprising compounding vegetable protein hydrolysates in cocoa powder in the presence of a common solvent.

3. The method of improving cacao by mellowing, accentuation and enrichment of cocoa flavor comprising mixing a solution of protein hydrolysates with cacao nibs, granulating and sizing the cacao to powder form.

4. The method of improving cacao by mellowing, accentuation and enrichment of cocoa flavor comprising forming a cacao liquor, mixing therewith a solution of vegetable protein hydrolysates on the order of from 4.5 per cent to 18 per cent by total solids weight and milling the mixture to a fine granular form.

5. The method of improving chocolate by mellowing, accentuation and enrichment of chocolate flavor comprising forming a cacao liquor, mixing therewith a solution of vegetable protein hydrolysates and solidifying the mix.

6. The method of improving cocoa by mellowing, accentuating and enriching cocoa flavor comprising mixing a solution of vegetable protein hydrolysates with cacao, granulating the mix, sizing the cacao to powder size, and expressing cacao fat from the mix.

7. The method of improving cocoa by mellowing, accentuation and enrichment of cocoa flavor comprising forming a cocoa solution, adding a solution of vegetable protein hydrolysates and agitating the mixture to form a chocolate syrup.

8. A cacao product having a mellowed, accentuated and enriched flavor comprising cacao modified by hydrolyzed vegetable protein present in an amount of from 4.5 per cent to 25 per cent based on solids weight.

9. A cacao product having a mellowed, accentuated and enriched flavor comprising cacao modified by hydrolyzed vegetable protein present in an amount of from 4.5 per cent to 25 per cent based on solids weight, approximately 30 per cent of the protein solids of said hydrolyzed protein being glutamic acid.

10. A chocolate syrup comprising cacao material compounded with hydrolyzed vegetable protein.

11. A chocolate powder comprising cacao material compounded with hydrolyzed vegetable protein.

12. A cacao food product containing cacao material and hydrolyzed vegetable protein.

ELMER K. PETTIBONE.

REFERENCES CITED

The following references are of record in the file of this patent:

UNITED STATES PATENTS

| Number | Name | Date |
|---|---|---|
| 737,432 | Meinl | Aug. 25, 1903 |
| 1,015,891 | Ikeda | Jan. 30, 1912 |
| 1,854,355 | Wallerstein | Apr. 19, 1932 |
| 1,992,462 | Barnett | Feb. 26, 1935 |
| 2,414,299 | Hall | Jan. 14, 1947 |

FOREIGN PATENTS

| Number | Country | Date |
|---|---|---|
| 407,866 | Great Britain | of 1934 |